INVENTOR
F. H. CHASE
BY
G. J. Heuerman
ATTORNEY

Nov. 2, 1954 F. H. CHASE 2,693,568

CURRENT AND VOLTAGE REGULATION

Filed March 5, 1952 2 Sheets-Sheet 2

INVENTOR

F. H. CHASE

BY

G. F. Heuerman

ATTORNEY.

United States Patent Office 2,693,568

Patented Nov. 2, 1954

2,693,568

CURRENT AND VOLTAGE REGULATION

Fay H. Chase, Short Hills, N. J., assignor to Bell Telephone Laboratories, Incorporated, New York, N. Y., a corporation of New York Application March 5, 1952, Serial No. 274,951

16 Claims. (Cl. 321—18)

Figure 1:
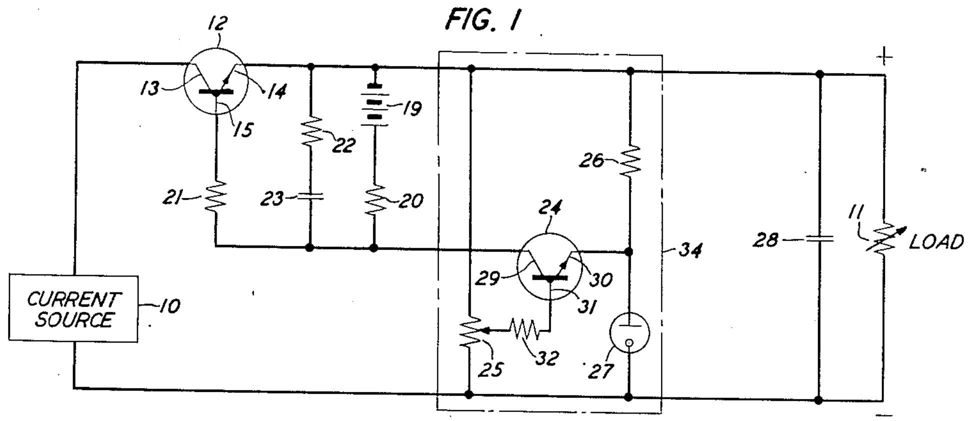

This invention relates to current and voltage regulation and more particularly to apparatus for controlling the supply of current from a current source to a load to minimize changes of load voltage.

An object of the invention is to provide a circuit including one or more transistors for regulating the supply of current from a current source to a load.

In specific embodiments of the invention herein shown and described for the purpose of illustration, voltage changes across a load to which direct current is supplied are amplified by a transistor amplifier. The direct current supplied to the load may be obtained from a direct or an alternating-current supply source. The current is supplied from the current source to the load through a regulating device which may be a second transistor or a space current device. When an alternating-current supply source is employed, the regulating device rectifies and regulates the current which is supplied from the source to the load. An amplified voltage derived from the transistor amplifier circuit is used to control the regulating device to cause it to control the current supplied to the load. Load voltage changes are thus minimized.

There are preferably employed transistors of the n-p-n type, such as is described in an article entitled "Some circuit properties and applications of n-p-n transistors," by R. L. Wallace and W. J. Pietenpol on page 530 et seq. of the Bell System Technical Journal, volume XXX, No. 3, July 1951. Such a transistor is a bar cut from a particular type of germanium or silicon crystal, for example. Each of the n type regions of the crystal is grown from a solution containing a small amount of an impurity from the fifth column of the periodic table such as arsenic. The p type region is grown from a solution containing a small amount of impurity from the third column of the periodic table such as boron. Three wires or electrodes are attached with mechanically strong connections to the three crystal regions, respectively, the wires being brought out through a hard, plastic impregnation. The connections to the n regions are called the emitter and collector, respectively, and the connection to the p region is called the base.

Some advantageous properties of transistors are small size, ruggedness, long life and the ability to operate on small power consumption. In some respects, the transistor is analogous in its functioning to a vacuum tube triode, the collector, emitter and base of the transistor corresponding to the anode, cathode and control electrode of the vacuum tube triode. In other respects the two devices are quite different. In operating the transistor, a positive potential should be applied to the collector and a negative potential should be applied to the emitter, each with respect to the base. Moreover, the characteristics of a transistor vary greatly with ambient temperature changes. A temperature controlled oven may be provided to maintain a transistor at constant temperature. In a preferred embodiment of the invention, there is provided a circuit arrangement comprising two transistors such that a collector-emitter current change due to ambient temperature change in one of the transistors introduces a compensating voltage change in the emitter-base circuit of the second transistor to maintain the collector-emitter current of the second transistor substantially independent of ambient temperature change.

Figure 5:
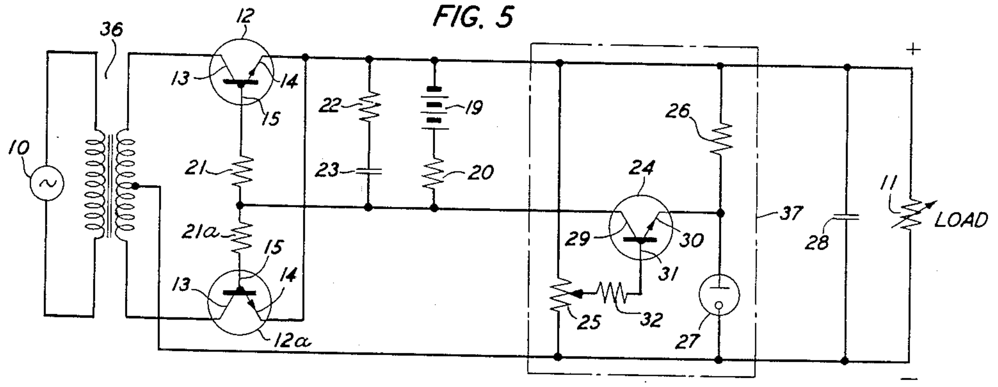
Figure 6:
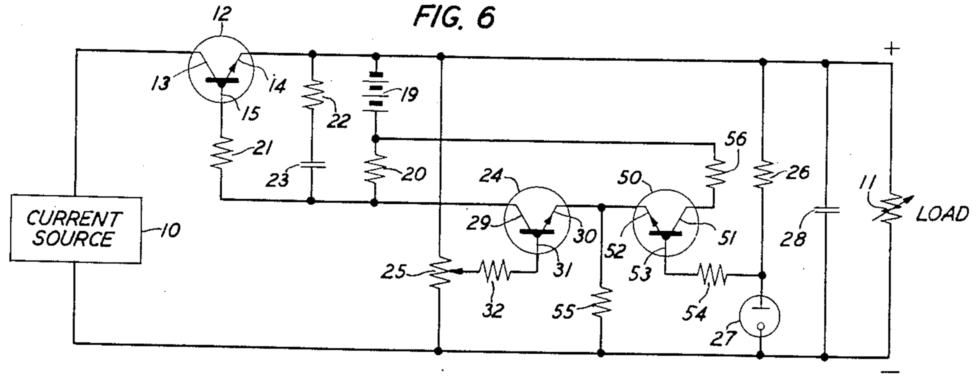
Figure 7:
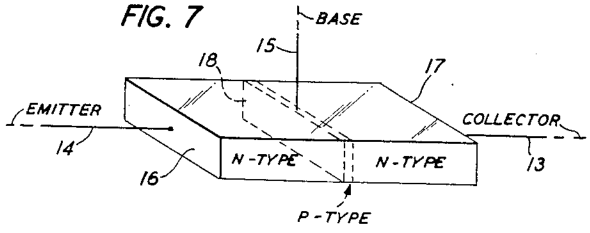

Figs. 1 to 6 are schematic views of circuits embodying the invention employing one or more transistors for regulating the supply of current from a current source to a load to minimize load voltage changes; and Fig. 7 is an enlarged diagrammatic view of an n-p-n type transistor.

Referring to the drawing, there is shown in Fig. 1 a circuit for supplying current from a current source 10 to a load 11 which may vary, the current source 10 being a source of either direct or alternating current. The current is supplied from the source to the load through a current regulating device 12 which is a transistor of the n-p-n type comprising three electrodes, that is, a collector 13, an emitter 14 and a base 15. As shown in Fig. 7, the transistor comprises a single crystal of germanium, for example, having two n type regions 16 and 17 and a p type region 18 intermediate the two n type regions. The n type regions of the crystal are grown from a solution containing a small amount of an impurity such as arsenic while the p type region is grown from a solution containing a small amount of an impurity such as boron. Wires or electrodes are attached to one of the n type regions of the crystal to form the emitter 14, to the other n type region to form the collector 13 and to the p type region to form the base 15.

If a direct-current source 10 is used, its positive terminal is connected to the collector 13 since it should be maintained at a positive potential with respect to the base 15. The emitter 14 should be at a negative potential with respect to the base 15. There is therefore provided a series circuit comprising an auxiliary direct current source or battery 19, a resistor 20 and a resistor 21, in order, connecting the emitter 14 and the base 15, a terminal of resistor 21 being directly connected to the base and the negative terminal of battery 19 being connected directly to the emitter 14. An anti-sing circuit comprising a resistor 22 and a condenser 23 in series is provided, a terminal of resistor 22 being connected to the emitter and a terminal of condenser 23 being connected to a common terminal of resistors 20 and 21.

There is provided an amplifier comprising a second transistor 24. Three current paths are connected across the load 11, one path comprising a potentiometer 25, a second path comprising in series a resistor 26 and a cold cathode, gas filled, constant voltage device 27 and the third path comprising a filter condenser 28. The transistor 24 comprises a collector 29, an emitter 30 and a base 31. The base 31 is connected through a resistor 32 to the adjustable contact of potentiometer 25. The emitter 30 is directly connected to the common terminal of resistor 26 and constant voltage tube 27. The collector 29 is connected directly to a common terminal of resistors 20 and 21 and condenser 23. The circuit constants are such that the collector 29 is at a positive poetential with respect to the base 31 and that the emitter 30 is at a negative potential with respect to the base 31.

Current flows from the positive load terminal, through a portion of potentiometer 25, through resistor 32, from the base 31 to the emitter 30 of transistor 24 and through constant voltage tube 27 to the negative load terminal. A substantially equal current flows from the positive load terminal through battery 19 and resistor 20, from the collector 29 to the base 31 of transistor 24, through resistor 32 and through a portion of potentiometer 25 to the negative load terminal. Since the current flowing into the collector and out of the base is substantially equal to the current flowing into the base and out of the emitter, in effect, substantially all the current flowing into the collector flows out of the emitter. When the load voltage increases, for example, the base 31 becomes more positive with respect to the emitter 30 to cause the base-emitter current to increase. Consequently, the collector-base current of transistor 24 flowing through resistor 20 increases to cause the potential of the base 15 of transistor 12 to become less positive with respect to the emitter 14. Thus the base-emitter current and the collector-base current of transistor 12 each decreases to cause a reduction of the current from source 10 flowing from collector to emitter of the transistor 12 and to the load 11. The initially assumed rise of voltage across the load 11 is thus minimized. The transistor 12 conducts current in one direction only between the collector and the emitter, that is, from the collector to the emitter. Therefore, if the source 10 is an alternating-current source, the current supplied to the load is rectified by the transistor 12.

Figure 2:
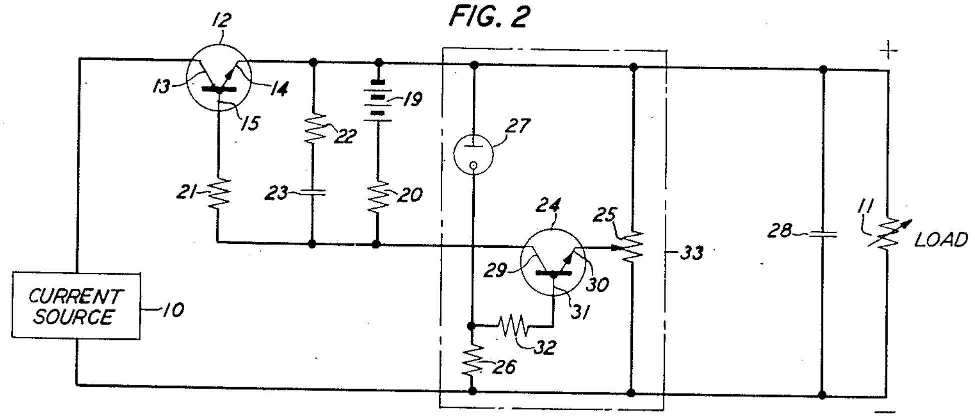

Fig. 2 is like Fig. 1 except that the elements enclosed by the dash-dot line 33 of Fig. 2 are differently connected than the corresponding elements enclosed by the dash-dot line 34 of Fig. 1. In Fig. 2, the emitter 30 of transistor 24 is connected directly to the adjustable contact of potentiometer 25 and the base 31 is connected through the resistor 32 to a common terminal of constant voltage tube 27 and resistor 26. In this case current flows from the positive load voltage terminal, through constant voltage tube 27, through resistor 32, through the base-emitter path of the transistor and through a portion of potentiometer 25 to the negative load terminal. A substantially equal current flows from the positive load terminal through battery 19 and resistor 20 through the collector-base path of the transistor, and through resistors 32 and 26 to the negative load terminal. As before, voltage changes corresponding to load voltage changes produced across resistor 20 control the transistor 12 to regulate the current supplied from the source 10 to the load 11.

Figure 3:
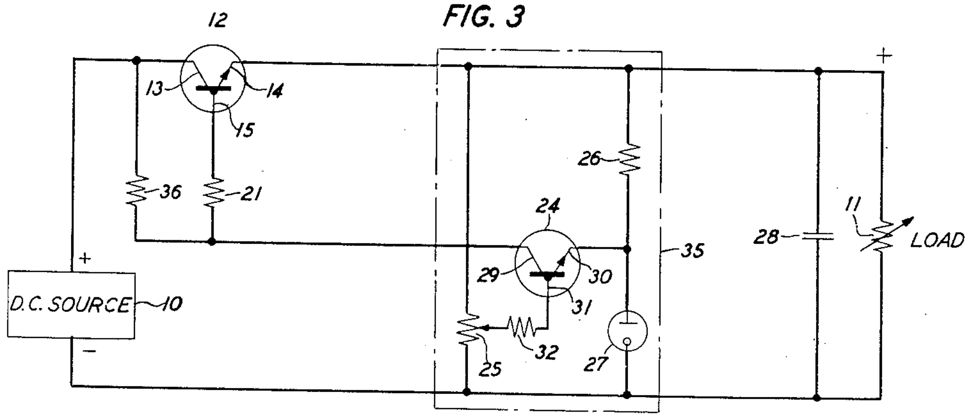

The current supply circuit shown in Fig. 3 is a modification of the supply circuits shown in Figs. 1 and 2. In the embodiment of Fig. 3 it is required that the current source 10 be a direct-current source. The elements within the enclosure 35 of Fig. 3 are shown as in Fig. 1 but the elements could be connected as shown within the enclosure 33 of Fig. 2, if desired.

In Figs. 1 and 2, since the collector-base current in transistor 12 is nearly equal to the base-emitter current, the current flowing through resistor 21 and the voltage drop across the resistor are small. This is also true in Fig. 3. In Fig. 3, current flows from the positive terminal of the direct-current source 10, through a resistor 36, through the collector-base path of transistor 24, through resistor 32 and through a portion of potentiometer 25 to the negative terminal of the source 10. The potential of the positive terminal of the current source 10 is positive with respect to the potential of the positive load terminal due to the voltage drop between the collector and emitter of transistor 12. If the current in this circuit rises due to an increase of load voltage, for example, the potential of the collector of transistor 24 becomes more negative with respect to the positive terminal of the source 10 or less positive with respect to the positive load terminal due to the increased voltage drop across resistor 36. Consequently decreased current flows in the circuit which may be traced from the positive terminal of source 10, through resistors 36 and 21, through the base-emitter path of transistor 12, and through the load 11 to the negative load terminal. A current reduction of similar magnitude thus occurs in the circuit traced from the positive terminal of source 10 comprising the collector-base path of transistor 12, resistor 21, the collector-base path of transistor 24, resistor 32 and a portion of potentiometer 25 to the negative terminal of source 10. The current from source 10 supplied to the load 11 through the collector-emitter path of transistor 12 is thus reduced to cause the initially assumed rise of load voltage to be minimized.

Figure 4:
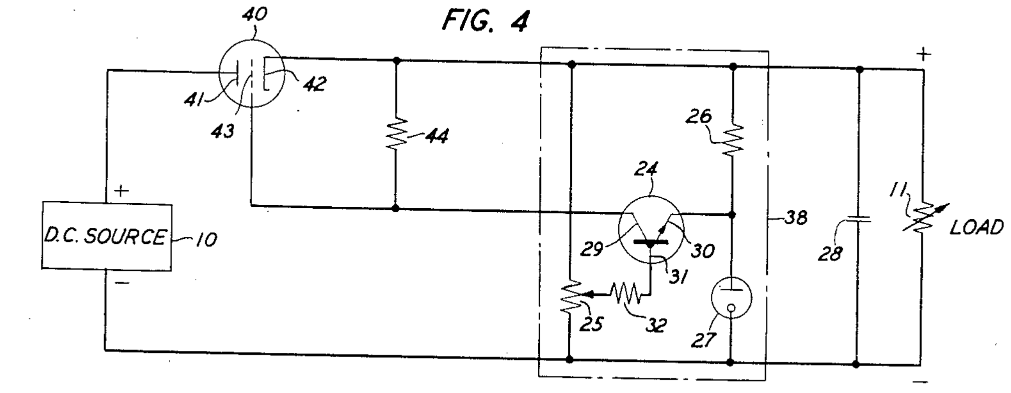

The current supply circuit of Fig. 4 is a modification of that shown in Fig. 3, the corresponding parts being similarly designated. In Fig. 4 there is provided a space current device 40 comprising an anode 41, a cathode 42 and a control electrode or grid 43. Current from the direct-current source 10 is transmitted through the anode-cathode path of tube 40 to the load 11, the positive terminal of source 10 being connected to the anode 41 and the cathode 42 being connected to the positive load terminal. A portion of the current from source 10 flowing through the space current tube 40 flows from the positive load voltage terminal through a resistor 44, through the collector-base path of transistor 24, through resistor 32 and through a portion of potentiometer 25 to the negative terminal of the load 11 and of current source 10. The control electrode 43 is connected to the common terminal of resistor 44 and collector 29 of transistor 24. Therefore, when the current flowing in the path comprising resistor 44 and the collector-base path of transistor 24 increases in response to an increase of load voltage, for example, the control grid 43 becomes more negative with respect to the cathode 42 to cause an increase of the resistance of the anode-cathode space current path of tube 40. The initially assumed rise of load voltage is thus minimized. The circuit elements shown within the enclosure 38 may, if desired, be connected as shown within the enclosure 33 of Fig. 2.

The circuit of Fig. 5 is like the circuit of Fig. 1, the corresponding parts being designated by the same numerals, with the exception that a transformer 36 and two transistors 12 and 12*a* are provided to permit full wave rectification of the current from alternating-current source 10 supplied to load 11. The emitter 14 of the transistor 12 is directly connected to the emitter 14 of transistor 12*a*. The base of transistor 12 is connected through resistors 21 and 21*a* to the base of transistor 12*a*, the common terminal of resistors 21 and 21*a* being connected to the common terminal of the collector 29 of transistor 24, condenser 23, and resistor 20. The end terminals of the secondary winding of transformer 36 are connected to the collectors 13 of transistors 12 and 12*a*, respectively, a mid-terminal of the winding being connected to the negative load terminal. The primary of transformer 36 is connected to the alternating-current source 10. During half-cycle periods of the alternating-current source when the collector 13 of transistor 12 is positive with respect to the mid-terminal of the secondary transformer winding, current is supplied through the collector-emitter path of transistor 12 to the load 11. Similarly, during half-cycle periods when the collector of transistor 12*a* is positive with respect to the mid-terminal of the secondary transformer winding, current is supplied through the collector-emitter path of transistor 12*a* to the load 11. The voltage across the current path comprising battery 19 and resistor 20 is in the emitter-base path of each of transistors 12 and 12*a* so that each of the transistors is controlled in response to load voltage changes in a manner to maintain the load voltage substantially constant. If desired, the elements shown within the enclosure 37 may be connected as shown within the enclosure 33 of Fig. 2.

Fig. 6 shows a current supply circuit which is a modification of the circuit shown in Fig. 1. In this circuit an additional transistor 50, like the transistor 24, is provided to compensate for changes of collector-base current in transistor 24 due to ambient temperature changes. Transistors 24 and 50 are maintained at the same temperature. The transistor 50 has a collector 51 connected through a resistor 56 to the positive terminal of battery 19, an emitter 52 connected to the emitter 30 of transistor 24 and through a resistor 55 to the negative load terminal, and a base 53 connected through a resistor 54 to a common terminal of resistor 26 and constant voltage tube 27. In the embodiment of Fig. 1, if the ambient temperature of transistor 24 should increase, for example, the current flowing in the path comprising resistor 20 and the collector-base path of transistor 24 would increase to cause the current supplied from source 10 through the collector-emitter path of transistor 12 to the load 11 to decrease. In Fig. 6, if the ambient temperature of transistors 24 and 50 should rise, the increased current flowing from the positive load terminal, through battery 19, resistor 56, the collector-emitter path of transistor 50 and through resistor 55 to the negative load terminal would increase to cause an increase of voltage across resistor 55. This increased voltage across resistor 55 makes the emitter of transistor 24 sufficiently less negative with respect to the base that the current flowing through the resistor 20 and the collector-base path of transistor 24 remains substantially unchanged due to the assumed rise of ambient temperature. However, as in Fig. 1, an increase of load voltage, for example, makes the emitter 30 of transistor 24 more negative with respect to the base 31 to cause an increased current flow through resistor 20. The emitter 14 of transistor 12 is thus made less negative with respect to the base to cause less current to flow through the collector-emitter path of transistor 12 to the load 11, whereby the assumed increase of load voltage is minimized. With the supply circuit of Fig. 6, therefore, the load voltage is maintained substantially constant irrespective of ambient temperature changes and within a certain normal range, the effect of ambient temperature changes of the transistor 12 on the load voltage is relatively small. Moreover, the compensating circuit comprising transistor 50 can be designed to compensate for changes of load voltage due to ambient temperature changes of both transistors 24 and 12.

What is claimed is:

1. In combination, a first and a second transistor each having a collector, an emitter and a base, means for supplying current from a source through the collector-emitter path of said first transistor to a load, means for supplying current through a circuit connecting the collector and base of said second transistor, means for impressing upon the emitter with respect to said base of said second transistor a potential having variations corresponding to load voltage changes, and means for deriving from the collector-base circuit of said second transistor and impressing between the emitter and base of said first transistor a voltage for controlling the current supplied to said load.

2. Means for supplying current from a current source to a load comprising current regulating means in a path connecting a terminal of said source and a terminal of said load, a transistor having a collector, an emitter and a base, means for supplying current to a current path comprising resistance and the collector-emitter path of said transistor, means for impressing upon said base with respect to said emitter a potential which varies in response to load voltage changes for controlling the current in said current path and means for controlling said regulating means in response to voltage changes across said resistance resulting from current changes in said current path to minimize said load voltage changes.

3. Means for supplying current from a current source to a load, said source and said load each having a first and a second terminal, comprising a first and a second transistor each having a collector, an emitter and a base, means for connecting the collector of said first transistor to a first terminal of said source, means for connecting said emitter of said first transistor to a first terminal of said load, means for conductively connecting the second terminal of said source to the second terminal of said load, a circuit connecting the emitter and base of said first transistor comprising in series in the order named an auxiliary direct-current source, a first resistor and a second resistor, the negative terminal of said auxiliary source being connected to said emitter, means for connecting a common terminal of said first and second resistors to the collector of said second transistor, a resistance path connected across said load and having a terminal intermediate its end terminals, a third resistor, means for connecting said intermediate terminal through said third resistor to the base of said second transistor, a second current path connected across said load comprising in series a fourth resistor and constant voltage device, a terminal of said fourth resistor being connected to said first terminal of said load, and means for connecting the emitter of said second transistor to a common terminal of said fourth resistor and said constant voltage device.

4. Means for supplying current from a current source to a load, said source and said load each having a first and a second terminal, comprising a first and a second transistor each having a collector, an emitter and a base, means for connecting the collector of said first transistor to a first terminal of said source, means for connecting said emitter of said first transistor to a first terminal of said load, means for conductively connecting the second terminal of said source to the second terminal of said load, a circuit connecting the emitter and base of said first transistor comprising in series in the order named an auxiliary direct-current source, a first resistor and a second resistor, the negative terminal of said auxiliary source being connected to said emitter, means for connecting a common terminal of said first and second resistors to the collector of said second transistor, a resistance path connected across said load and having a terminal intermediate its end terminals, means for connecting said intermediate terminal to the emitter of said second transistor, a third resistor, a second current path connected across said load comprising in series a fourth resistor and a constant voltage device, a terminal of said fourth resistor being connected to said second terminal of said load, and means for connecting the base of said second transistor through said third resistor to a common terminal of said fourth resistor and said constant voltage device.

5. Means for supplying current from a direct-current source to a load comprising a first and a second transistor each having a collector, an emitter and a base, means for connecting the collector of said first transistor to the positive terminal of said source, means for connecting the emitter of said first transistor to the positive load terminal, means for connecting the negative load terminal to the negative terminal of said source, a current path connecting the collector and the base of said first transistor comprising a first and a second resistor in series, means for connecting the common terminal of said first and second resistors to the collector of said second transistor, a resistance path connected across said load having a terminal intermediate its end terminals, a third resistor, means comprising said third resistor for connecting said intermediate terminal to the base of said second transistor, a fourth resistor, a constant voltage device, a current path connected across said load comprising said fourth resistor and said constant voltage device in series, a terminal of said fourth resistor being connected to the positive load terminal, and means for connecting the emitter of said second transistor to the common terminal of said fourth resistor and said constant voltage device.

6. Means for supplying current from a direct-current source to a load comprising a first and a second transistor each having a collector, an emitter and a base, means for connecting the collector of said first transistor to the positive terminal of said source, means for connecting the emitter of said first transistor to the positive load terminal, means for connecting the negative load terminal to the negative terminal of said source, a current path connecting the collector and the base of said first transistor comprising a first and a second resistor in series, means for connecting the common terminal of said first and second resistors to the collector of said second transistor, a resistance path connected across said load having a terminal intermediate its end terminals, means for connecting said intermediate terminal to the emitter of said second transistor, a third resistor, a fourth resistor, a constant voltage device, a current path connected across said load comprising said fourth resistor and said constant voltage device in series, and means comprising said third resistor for connecting the base of said second transistor to the common terminal of said fourth resistor and said constant voltage device.

7. Means for supplying current from a direct-current source to a load comprising a space current device having an anode, a cathode and a control electrode, means for connecting said anode to the positive terminal of said source, means for connecting said cathode to the positive load terminal, means for connecting said negative load terminal to the negative terminal of said source, a resistive path connecting said cathode and said control electrode, a transistor having a collector, an emitter and a base, means for connecting said collector to said control electrode, resistance means connected across said load having a terminal intermediate its end terminals, a first resistor, means comprising said first resistor for connecting said base to said intermediate terminal, a second resistor, a constant voltage device, means for connecting said second resistor and said constant voltage device in series across said load, a terminal of said second resistor being connected to the positive load terminal, and means for connecting said emitter to a common terminal of said second resistor and said constant voltage device.

8. Means for supplying current from a direct-current source to a load comprising a space current device having an anode, a cathode and a control electrode, means for connecting said anode to the positive terminal of said source, means for connecting said cathode to the positive load terminal, means for connecting said negative load terminal to the negative terminal of said source, a resistive path connecting said cathode and said control electrode, a transistor having a collector, an emitter and a base, means for connecting said collector to said control electrode, resistance means connected across said load having a terminal intermediate its end terminals, means for connecting said emitter to said intermediate terminal, a first resistor, a second resistor, a constant voltage device, means for connecting said second resistor and said constant voltage device in series across said load, a terminal of said second resistor being connected to the negative load terminal, and means comprising said first resistor for connecting said base to a common terminal of said constant voltage device and said second resistor.

9. Means for rectifying current from an alternating-current supply source and for supplying the rectified current to a load comprising a transformer having a primary winding connected to the alternating-current source and a secondary winding having two end terminals and a mid-terminal, means for connecting said mid-terminal to the negative terminal of the load, a first, a second and a third transistor each having a collector, an emitter and a base, means for connecting the collectors of said first and second transistors to the end terminals of said secondary winding respectively. means for connecting the emitters of said first and second transistors to the positive load terminal, a first, a second and a third resistor, means comprising said first and second resistors for connecting the bases of said first and second transistors, an auxiliary direct voltage source, means comprising said auxiliary voltage source and said third resistor in series for connecting a common terminal of said first and second resistors to the emitters of said first and second transistors, the negative terminal of said voltage source being connected to said emitters, means for connecting a common terminal of said first, second and third resistors to the collector of said third transistor, a potentiometer connected across said load, a fourth resistor, means for connecting the variable tap of said potentiometer through said fourth resistor to said base of said third transistor, a fifth resistor, a constant voltage device, means for connecting said fifth resistor and said constant voltage device in series across said load, and means for connecting the emitter of said third transistor to a common terminal of said fifth resistor and said constant voltage device.

10. Means for rectifying current from an alternating-current supply source and for supplying the rectified current to a load comprising a transformer having a primary winding connected to the alternating-current source and a secondary winding having two end terminals and a mid-terminal, means for connecting said mid-terminal to the negative terminal of the load, a first, a second and a third transistor each having a collector, an emitter and a base, means for connecting the collectors of said first and second transistors to the end terminals of said secondary winding respectively, means for connecting the emitters of said first and second transistors to the positive load terminal, a first, a second and a third resistor, means comprising said first and second resistors for connecting the bases of said first and second transistors, an auxiliary direct voltage source, means comprising said auxiliary voltage source and said third resistor in series for connecting a common terminal of said first and second resistors to the emitters of said first and second transistors, the negative terminal of said voltage source being connected to said emitters, means for connecting a common terminal of said first, second and third resistors to the collector of said third transistor, a potentiometer connected across said load, means for connecting said emitter of said third transistor to the variable tap of said potentiometer, a fourth and a fifth resistor, a constant voltage device, means comprising said fifth resistor and said constant voltage device connected in series across said load, a terminal of said constant voltage device being connected to the positive load terminal, and means comprising said fourth resistor for connecting said base of said third transistor to the common terminal of said fourth resistor and said constant voltage device.

11. In combination, a first and a second transistor each having a collector, an emitter and a base, a resistor having a first and a second terminal, means for connecting said first terminal of said resistor to each of said emitters, a first circuit connecting the emitter and base of said first transistor comprising said resistor, means for impressing upon said first circuit a substantially fixed voltage for biasing said emitter of said first transistor negatively with respect to its base, a second circuit comprising said resistor and a first and a second branch path in parallel, said first branch path comprising the collector-emitter path of said first transistor, said second branch path comprising the collector-emitter path of said second transistor, a third circuit connecting the emitter and base of said second transistor comprising said resistor, and means for impressing upon said third circuit a voltage which may vary for controlling the current in said second branch path.

12. In combination, a first and a second transistor each comprising a collector, an emitter and a base, a source of direct voltage, a resistive path connected across said voltage source having a terminal intermediate its end terminals, a first, second, third, fourth, fifth and sixth resistor, a constant voltage device, a current path connected across said voltage source comprising in series said first resistor and said constant voltage device, a terminal of said first resistor being connected to the positive terminal of said source, means comprising said second resistor for connecting the collector of said first transistor to the positive terminal of said source, means comprising said third resistor for connecting the emitters of said first and second transistors to the negative terminal of said source, means comprising said fourth resistor for connecting the collector of said second transistor to the positive terminal of said source, means comprising said fifth resistor for connecting the base of said first transistor to the common terminal of said first resistor and said constant voltage device, and means comprising said sixth resistor for connecting the base of said second transistor to said intermediate terminal of said resistive path.

13. Means for supplying current from a current source to a load comprising a first, a second and a third transistor each having a collector, an emitter and a base, means for connecting the collector of said first transistor to a first terminal of said source, means for connecting the emitter of said first transistor to the positive load terminal, means for connecting the second terminal of said source to the negative load terminal, a first, a second, a third, a fourth, a fifth, a sixth and a seventh resistor, an auxiliary direct voltage source, a circuit connecting said emitter and said base of said first transistor comprising in series in order said auxiliary voltage source, said first resistor and said second resistor, the negative terminal of said auxiliary source being connected to said emitter, means comprising said third resistor for connecting the positive terminal of said auxiliary source to the collector of said third transistor, means for connecting the common terminal of said first and second resistors to the collector of said second transistor, means comprising said fourth resistor for connecting the emitters of said second and third transistors to the negative load terminal, a resistive path connected across said load having a terminal intermediate its end terminals, means comprising said fifth resistor for connecting said intermediate terminal to the base of said second transistor, a constant voltage device, a current path connected across said load comprising in series said sixth resistor and said constant voltage device, a terminal of said sixth resistor being connected to the positive load terminal, and means comprising said seventh resistor for connecting the base of said third transistor to a common terminal of said sixth resistor and said constant voltage device.

14. In combination, a source of direct voltage having positive and negative terminals, a resistive current path having end terminals connected to said positive and negative terminals respectively and having a first terminal intermediate said end terminals, a constant voltage device, a resistor, a current path comprising said constant voltage device and said resistor in series having end terminals connected to said positive and negative terminals respectively and having a second terminal common to said resistor and said constant voltage device, a transistor having a collector, an emitter and a base, means for connecting said emitter to one of said first and second terminals, means for connecting said base to the other of said first and second terminals, and a current path having resistance connecting said collector to one of said positive and negative terminals.

15. The combination with a source of unidirectional voltage having a positive and a negative terminal, of two transistors of the same type each having a collector, an emitter and a base, first and second current paths connecting said collectors respectively to one of said terminals, resistance means, means comprising said resistance means for connecting said emitters to the other of said terminals, means for impressing upon the base of one of said transistors a substantially fixed potential with respect to the potential of said other of said terminals and means for impressing upon the base of the other of said transistors a potential which may vary with respect to the potential of said other of said terminals to control the currents in said first and second current paths.

16. In combination, a source of voltage having a pair of terminals, two transistors of a similar type each having a collector, an emitter and a base, a first, a second and a third impedance element, means comprising said first impedance element for connecting one of said collectors to one of said terminals, means comprising said second impedance element for connecting the other of said collectors to said one terminal, means comprising said third impedance element for connecting said emitters to the other of said terminals, means for impressing upon the base of one of said transistors a substantially fixed potential with respect to the potential of one of said terminals, and means for impressing upon the base of said other transistor a potential intermediate the potentials of said first and second terminals.

References Cited in the file of this patent

UNITED STATES PATENTS

| Number | Name | Date |
| --- | --- | --- |
| 2,206,123 | Rinia et al. | July 2, 1940 |
| 2,476,323 | Rack | July 19, 1949 |
| 2,486,776 | Barney | Nov. 1, 1949 |
| 2,502,479 | Pearson et al. | Apr. 4, 1950 |